Dec. 12, 1950     O. H. SCHMITT     2,533,286
HEAT SENSITIVE CIRCUITS
Filed July 22, 1946
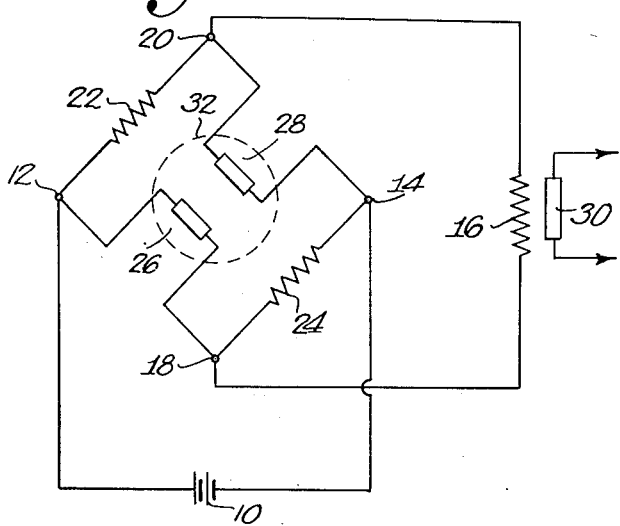
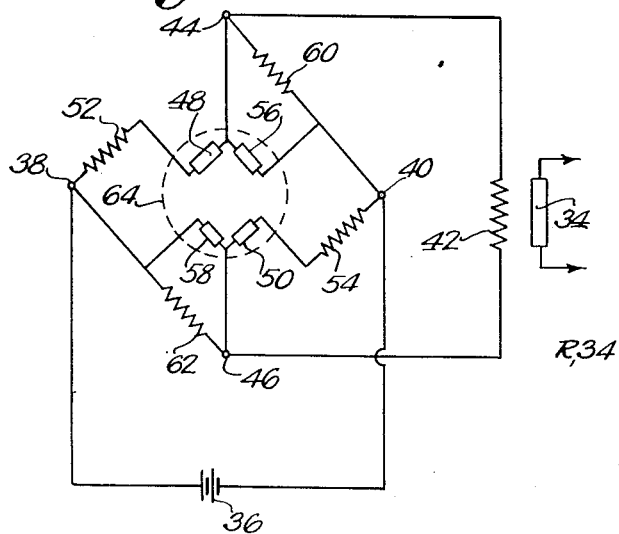
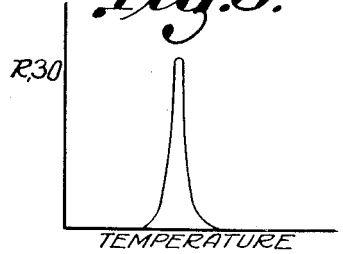
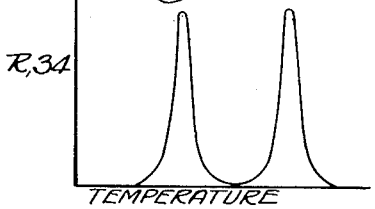
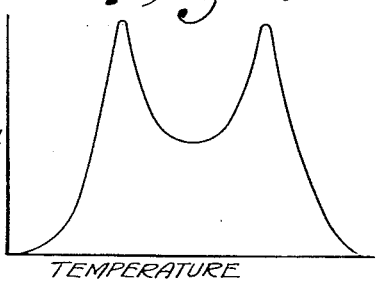
Inventor:
OTTO H. SCHMITT.
By Paul, Paul & Moore
Attorneys.

Patented Dec. 12, 1950

2,533,286

UNITED STATES PATENT OFFICE 2,533,286

HEAT SENSITIVE CIRCUITS

Otto H. Schmitt, Mineola, N. Y., assignor to Regents of the University of Minnesota, Minneapolis, Minn., a corporation of Minnesota Application July 22, 1946, Serial No. 685,349

5 Claims. (Cl. 219—20)

This invention relates to electrical circuits. More particularly, it relates to thermistors, which are conductors or semiconductors the resistance of which is a function of temperature. Thermistors are circuit elements having very large temperature coefficient of resistance and are described in a paper by Becker et al. entitled "Properties and Uses of Thermistors—Thermally Sensitive Resistors," Electrical Engineering Transactions, Nov. 1946, pages 711–725. For convenience in nomenclature the term "thermistor" as used in the instant specification and claims shall be understood as meaning devices of the character described in the aforesaid publication.

From its primary properties as an element, the thermistor has been used for temperature indicating and control purposes, and when intermittently heated, either externally or internally, it has been used for time-delay purposes. In its various applications, its resistance has been taken as decreasing indefinitely as the temperature rises within its operating limits.

It is the object of this invention to extend the utility of thermistors and to provide circuits whereby additional properties may in effect be attributed to them.

It is a further object of this invention to provide a device responsive to multiple critical temperatures or to a critical temperature zone.

Other and further objects of the invention are those inherent in the apparatus herein illustrated, described and claimed.

According to this invention, an impedance bridge is arranged to include a thermistor in at least one arm and a second thermistor is arranged to be heated by the unbalance current of the bridge. In this broad aspect of the invention, the second thermistor is preferably heated by an external resistor, and is thus electrically isolated from the remainder of the circuit. This bridge has notable temperature response and time-delay characteristics, as will be clear from the detailed disclosure below.

Furthermore, this invention in effect extends thermistor properties to have multiple critical temperature ranges or a critical temperature band over which the device is responsive. This is accomplished by arranging one thermistor in series with a resistor, and in series therewith a thermistor and resistor are connected in parallel, these two resistor-thermistor units arranged as adjacent arms of a bridge. The unbalance voltage will vary with heating of the thermistors in the bridge arms so that another thermistor, in the diagonal of the bridge, will be variably heated to yield a double-hump curve of diagonal thermistor resistance plotted against temperature of the thermistors in the bridge arms. Reactors may be substituted for the resistors for alternating current service, though resistors are preferable.

For a more complete understanding of the invention, reference is made to the following detailed description and to the drawings, in which Figures 1 and 2 are illustrative species of electrical circuits embodying certain aspects of this invention;

Figure 3 is a temperature-resistance characteristic of the species in Figure 1; and Figures 4 and 5 are temperature-resistance characteristics that may be obtained from the circuit of Figure 2 using various constants.

Referring now to Figure 1, power supply 10 which may be either direct current or alternating current is impressed on terminals 12 and 14 of an impedance bridge, while heating element 16 is connected to terminals 18 and 20 of the bridge. Impedances 22 and 24 are connected between terminals 12 and 20, and 18 and 14, respectively, while thermistors 26 and 28 are connected between terminals 12 and 18, and 20 and 14, respectively. A thermistor element 30 is located closely adjacent heater 16. Impedances 22 and 24 are preferably matched resistors, and elements 26 and 28 are preferably matched thermistors, the resistance of each of which is equal to that of each resistance 22 and 24 at a predetermined temperature.

It will be evident that the unbalance of the bridge will depend upon the temperature to which thermistors 26 and 28 are both exposed, in the area indicated by dotted circle 32. For temperatures below or above that at which balance is obtained, the unbalance current in resistor 16 will heat thermistor element 30 so that its resistance will sharply decrease. Only for a limited temperature range with a sharp peak will the resistance of thermistor element 30 rise. This rise is sharp and extends over a limited temperature range. It is notable that the resistance of a thermistor element should rise for an elevated temperature, a characteristic that is adaptable to a wide variety of uses and is contrary to the usual behavior of thermistors.

The circuit of Figure 1 may be modified to diminish the sharpness of the response curve by substituting a resistor for one of the thermistors. Where only one thermistor is used in the bridge and an alternating-current power supply is used, appropriate reactors may be used in any of the arms. Where isolation is unnecessary, a less practical arrangement is to heat thermistor element 30 directly by passing the unbalance current through it.

The peaked characteristic in Figure 3, which represents the resistance of thermistor element 30 plotted against temperature of the other thermistors, may be simulated in the case of the circuit in Figure 2 for multiple critical temperatures as in Figure 5 and for a temperature zone (with two critical peaks) as in Figure 4. In Figures 4 and 5, it is the resistance of thermistor element 34 which is plotted against the temperature of the thermistors in the bridge arms.

In Figure 2, power supply 36 is connected to terminals 38 and 40 of the bridge. Heater 42 for thermistor 34 is connected between terminals 44 and 46 of the bridge. Matched thermistors 48 and 50 are connected in series with matched resistors 52 and 54 between terminals 38 and 44, and terminals 40 and 46, respectively. Matched thermistors 56 and 58 are connected in parallel with matched resistors 60 and 62 between terminals 40 and 44, and 38 and 46, respectively. Resistors 60 and 62 are preferably alike but may be the same or different from resistors 52 and 54. Thermistors 48 and 50 may or may not match thermistors 56 and 58. They are arranged to be exposed to the same temperature within dotted circle 64. All the resistors and thermistors may be dissimilar.

The curve of Figure 4 was obtained through the use of Bell Telephone Laboratories thermistor type ESP-629867 at 56 and 58, while BTL type ESL-630321 was used at 48 and 50. Thermistor 34 and its heater were BTL type D-158997. Resistors 52, 54, 60 and 62 were all 100 ohms. The curve of Figure 5 was obtained with the same constants except that resistors 60 and 62 were 300 ohms.

It is evident that the circuit of Figure 2 may be used with the thermistors within circle 64 arranged for temperature measurement and for operation of controls for a critical zone or zones in a chemical process or the like.

The bridges of Figures 1 and 2 may be used for their temperature-response characteristics discussed above, by connecting to thermistor elements 30 and 34 a resistance-measuring device, calibrated according to the temperature of circles 32 and 64. Those bridges may also be used for time-delay or timing sequence purposes. Thermistors in the past have been heated by the current they pass or by an external resistor, and when so arranged, have been used to operate various single devices in a single manner after a predetermined time interval. With suddenly started heating of the thermistors in circles 32 and 64 optionally by the bridge current but preferably by an auxiliary heater, the resistance of thermistor elements 30 and 34 varies from a high, normal value to a low value, then to a high value (Figure 3) again and further to a low value, which cycle is substantially repeated in Figures 4 and 5. This reversal, optionally repeated, is an obviously useful effect.

For convenience of definition, the impedances 22 and 24 of the bridge circuit shown in Figure 1 are regarded as opposite branches of the bridge circuit; similarly the thermistors 26 and 28 are opposite branches of the bridge circuit. Likewise in regard to Figure 2, in the bridge circuit there shown, the branch composed of impedance 52 and thermistor 48 in series is considered as opposite to the branch containing impedance 54 and thermistor 50 in series. Similarly the branch containing impedance 62 and thermistor 58 in parallel is considered as opposite to the branch containing impedance 60 and thermistor 56 in parallel.

As many apparently widely different embodiments of this invention may be made without departing from the spirit and scope thereof, it is to be understood that I do not limit myself to the specific embodiments herein except as defined by the appended claims.

What I claim is:

1. An impedance bridge circuit of the Wheatstone type having input and output terminals and containing first and second thermistor elements, one in each of two opposite branches of the bridge circuit, and first and second impedances, one in each of the other pair of opposite branches of the bridge circuit, and means for heating said first and second thermistors simultaneously, said circuit being further characterized in that the first and second impedances each has a thermistor in series therewith and the first and second thermistors each has an impedance in parallel therewith.

2. An impedance bridge circuit of the Wheatstone type having input and output terminals and containing first and second thermistor elements, one in each of two opposite branches of the bridge circuit, and first and second impedances, one in each of the other pair of opposite branches of the bridge circuit, and means for heating said first and second thermistors simultaneously, said circuit being further characterized in that the first and second impedances each has a thermistor in series therewith and the first and second thermistors each has an impedance in parallel therewith, said series thermistors being heated simultaneously with said first and second thermistors.

3. A heat sensitive thermistor bridge comprising first and second input terminals and first and second output terminals, a first thermistor and first resistor in series therewith connected between the first input and second output terminals, a second thermistor and second resistor in series therewith connected between the second input and first output terminals, a third thermistor and third resistor in parallel therewith connected between the first input and first output terminals and a fourth thermistor and fourth resistor connected between the second input and second output terminals, and a common enclosure for said thermistors.

4. The apparatus of claim 3 further characterized in that a fifth resistance element is connected across the first and second output terminals and a fifth thermistor is located in heat communication therewith.

5. In a thermistor system having a responsive thermistor, a heating element therefor and a supply circuit therefor, said supply circuit having first and second input terminals and first and second output terminals, a first thermistor and first resistor in series therewith connected between the first input and second output terminals, a second thermistor and second resistor in series therewith connected between the second input and first output terminals, a third thermistor and third resistor in parallel therewith connected between the first input and first output terminals and a fourth thermistor and fourth resistor connected between the second input and second output terminals, and a common enclosure for said thermistors, said heating element being connected to the first and second output terminals of the supply circuit.

OTTO H. SCHMITT.

REFERENCES CITED

The following references are of record in the file of this patent:

UNITED STATES PATENTS

| Number | Name | Date |
|---|---|---|
| 1,694,264 | Hull | Dec. 4, 1928 |
| 2,025,775 | Rieber | Dec. 31, 1935 |
| 2,175,890 | Glowatzki | Oct. 10, 1939 |
| 2,193,578 | Bruce | Mar. 12, 1940 |
| 2,230,243 | Haffcke | Feb. 4, 1941 |
| 2,278,633 | Bagnall | Apr. 7, 1942 |
| 2,343,759 | Fairley et al. | Mar. 7, 1944 |
| 2,375,497 | Scully | May 8, 1945 |
| 2,396,196 | Pearson | Mar. 5, 1946 |
| 2,429,827 | Lamm | Oct. 28, 1947 |

FOREIGN PATENTS

| Number | Country | Date |
|---|---|---|
| 144,669 | Great Britain | Sept. 9, 1921 |

OTHER REFERENCES

Keystone Carbon Co., February, 1945, "Electronics," page 169.